Oct. 10, 1950 — L. B. HAUGHWOUT — 2,525,746
FILM HANDLING DEVICE
Filed July 25, 1946 — 2 Sheets-Sheet 2
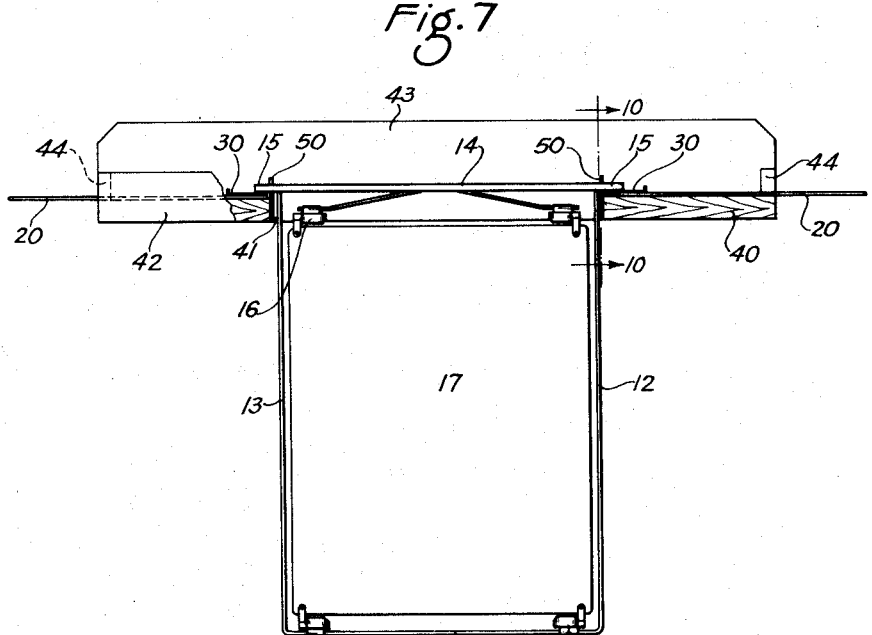
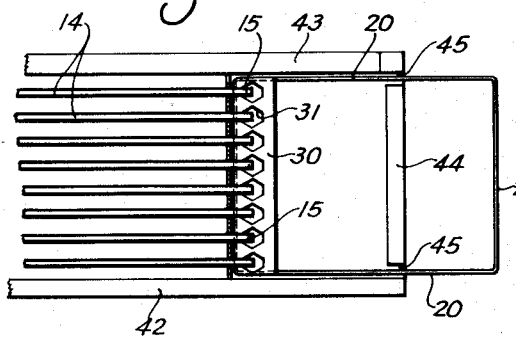
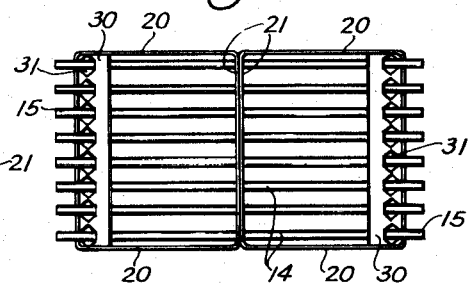
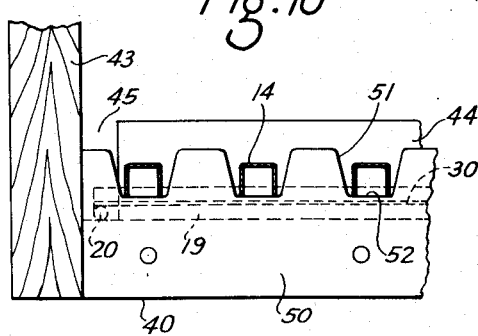
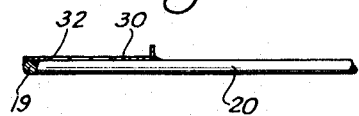
Lefferd B. Haughwout
INVENTOR Patented Oct. 10, 1950

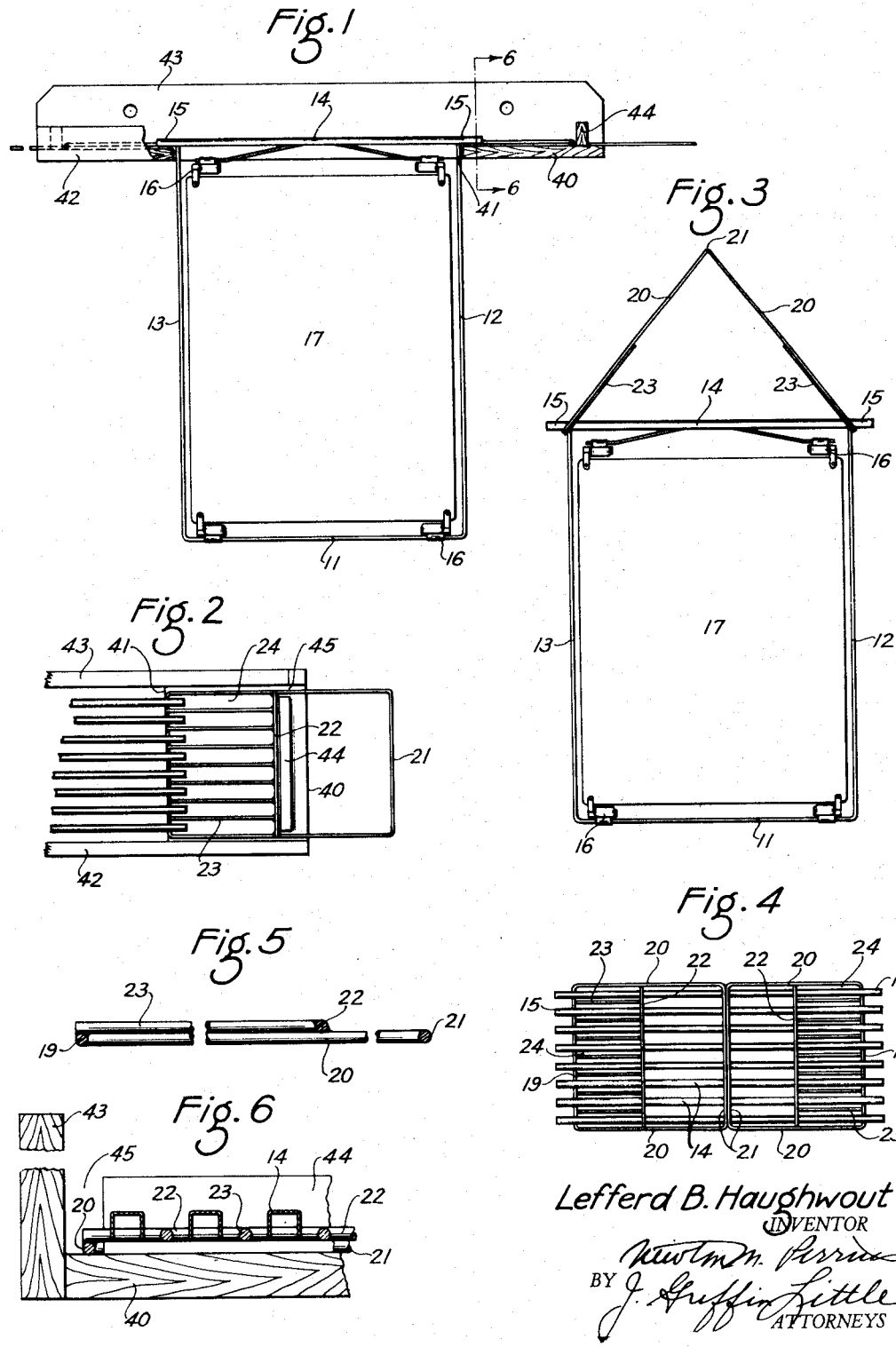

2,525,746

UNITED STATES PATENT OFFICE 2,525,746

FILM HANDLING DEVICE

Lefferd B. Haughwout, Elyria, Ohio

Application July 25, 1946, Serial No. 686,106

8 Claims. (Cl. 95—100)

1

The present invention relates to a handling device, and more particularly to a handling device for X-ray film hangers.

The principal object of the invention is the provision of a device by which a plurality of film hangers may be lifted and moved as a unit.

A further object of the invention is the provision of a device of the class described, which may be used to place the hangers as a unit in, and remove the hangers from, the processing liquids or baths.

A still further object of the invention is the provision of such a handling device by which the hangers may be moved in the processing liquids to afford the desired agitation.

And a still further object of the invention is the provision of a handling device which is simple in construction, of few parts of rugged construction, easy to operate, inexpensive to make, and highly effective in use.

Yet another object of the invention is the provision of a loading frame on which a plurality of film hangers and a lifting device may be arranged in proper relation.

To these and other ends, the invention resides in certain improvements and combinations of parts, all as will be hereinafter more fully described, the novel features being pointed out in the plans at the end of the specification.

In the drawings:

Fig. 1 is a side elevation view, with parts in section, showing the relation of the lifting device and the loading frame of the present invention during the loading operation;

Fig. 2 is a partial plan view of the loading frame and lifting device shown in Fig. 1;

Fig. 3 shows the lifting or handling device arranged to lift and carry the film hangers;

Fig. 4 is a plan view of the hangers and lifting device shown in Fig. 3;

Fig. 5 is a longitudinal sectional view through the preferred form of lifting device;

Fig. 6 is a vertical sectional view taken substantially on line 6—6 of Fig. 1, showing the relation of the lifting device and the top tie rods of the film hangers when in position in the loading frame;

Fig. 7 is a view similar to Fig 1, but showing a modified form of lifting device and loading frame;

Fig. 8 is a partial plan view of the apparatus shown in Fig. 7, showing the form of the modified lifting device;

Fig. 9 is a view similar to Fig. 4, but showing

2 the arrangement of the film hangers and the modified lifting device;

Fig. 10 is a vertical sectional view of the loading frame and lifting device illustrated in Fig. 7 and taken substantially on line 10—10 of the latter; and Fig. 11 is a sectional view through a portion of the modified lifting device, showing the arrangement for engaging and supporting the projecting portions of the hanger tie rods.

Similar reference numerals throughout the various views indicate the same parts.

The device of the present invention was developed for the purpose of facilitating the handling of X-ray films during the processing operations of developing, fixing, washing, etc. While such a device is primarily designed and intended for use in connection with X-ray films, it is obvious that it may be used and is adapted for use in the processing of any other films or plates where hangers are used.

The drawings show two embodiments of the handling device for use in connection with X-ray film hangers which are formed from a piece of wire to provide a U-shaped frame or hanger, having a bottom 11, and opposite sides 12 and 13. A top rail or tie rod 14 connects the side members 12 and 13 and has portions 15 which project laterally beyond the side members 12 and 13, as clearly shown in Figs. 1, 3, 4, 7 and 9. Each film hanger is provided with spring clips 16 adapted to engage the corners of the X-ray film 17, for reasons well-known to those in the art. As such hangers are of well-known construction and do not form a part of the present invention, further description is not necessary.

After the films are mounted in the hangers, the latter are positioned in the processing liquids or baths. To facilitate handling of such hangers, the present invention provides a handling or lifting device by which a plurality of such hangers may be lifted or carried and placed in, and/or removed from, the processing baths as a unit.

The preferred form of handling or lifting device is formed from a piece of wire of suitable composition, which is bent to form an open rectangular frame having a bottom piece 19, opposite side pieces 20 and a handle or gripping portion 21, as shown in Figs. 1 to 5. A cross piece 22 connects the sides 20 and is spaced from the bottom 19, while a plurality of rows 23 connect the bottom 19 and the cross-piece 22 to provide a plurality of openings 24, as best shown in Fig.

2, the number of such openings provided depending, of course, on the number of film hangers to be accommodated.

By means of this arrangement, the end portions 15 at the opposite ends of the film hangers extend into the openings 24, and are supported on and by the bottoms 19 of the two lifting members. Thus a pair of sling-like members are detachably and rockably connected to the film hangers, and may be utilized to lift, move, or carry a plurality of hangers, as shown in Fig. 2. These handling or lifting devices may be arranged to extend upwardly from the top rail 14 to provide separate handles, or they may be rocked or moved about the top rails 14 to bring the handle portions 21 into the position shown in Fig. 3, to provide a basket-like handle construction by which the group of hangers may be supported and carried in one hand of the operator. Thus, the two handling devices are detachably and rockably connected to the portions 15 of the plurality of film hangers.

Figs. 7 to 11 showing modified form of handling or lifting device and parts corresponding to those in Figs. 1 to 7 are designated by the same numerals. In this modified device, the lower ends of the sides 20, are connected by a flat plate 30, formed with a plurality of apertures 31 of the shape best shown in Figs. 8 and 9, the number of such apertures provided depending, of course, on the number of hangers to be handled at one time. The portions 15 of the hanger rails 14 extend through the apertures 31 and are adapted to rest on and be supported by the lower edge of 32 thereof. Like the handling device of Figs. 1 to 6, the device of Figs. 7 to 11 may extend substantially vertical from the hangers to provide two spaced handle members, or they may be rocked about the edges 31 on the portions 14 to a position similar to that illustrated in Fig. 3, to about a single basket-like handle.

Both of the handling or lifting devices above described are adapted to support a plurality of film hangers.

While in the developer, the films may be agitated by raising and lowering the hangers in the solution by means of the handling devices, thus assuring a high degree of uniformity in the developing of all films of a given batch. On completion of development, the films and hangers are carried, as a unit by means of the handling devices, through the stop bath, fixer and into the final wash. If at any time during the processing operation it should be desirable to inspect a negative or film, the handling devices may be removed merely by slipping the portions 15 out of the apertures 24 or 31, depending upon the type of device used. However, if there is no need to inspect the films until they are dry, the handling or lifting devices may be left in place and connected to the hangers during the final wash, and may be used to drain the excess water from the films before they are placed in the dryers. Thus the operator may carry the films through the various processing liquids without detaching the hangers from the handling devices and without getting his hands contaminated with the processing chemicals or solutions.

While it is contemplated that the film hangers may be individually and successively connected to the handling devices by manually inserting the portions 15 in the openings 24 or apertures 31, it is preferred to provide an arrangement by which all the hangers may be simultaneously connected in one single and simple operation. To this end, the present invention provides a loading frame or box in which the film hangers are positioned and on which the handling devices are arranged to be brought into engagement with the portions 15 of the film hangers. The loading frames comprise a base 40 having a central aperture or opening 41 of such size as to permit the passage therethrough of the film hangers, as shown in Figs. 1 and 7. A low front wall 42 and a higher back wall 43 extend upwardly from the base 40. These walls are connected by crosspieces or end walls 44, which are spaced a suitable distance from the opening 41, as shown in Figs. 2 and 8. These end walls are formed with slots 45, adapted to receive the sides 20 of the handling devices so that the latter may lie flat on the base 40, as shown in Figs. 1 and 7.

In the arrangement shown in Fig. 1 the handling devices are positioned so that the bottom members 19 are arranged adjacent the opposite sides of the opening 41 so that the portions 15 may rest on and be supported by the bottoms 19, with the portions 15 overlying the openings 24 between the rods 23 as clearly illustrated in Fig. 2. When all, or the desired number, of hangers have been arranged in position on the loading frame or box, the handles portion 21, Figs. 1 to 6, are swung upwardly about the portions 15. This movement serves to bring the portions 15 into position in the openings 24, with the portions supported on the bottom members 19, as shown in Figs. 3 and 4. The entire group of hangers may then be lifted as a unit out of the loading frame and carried as a unit by the handling devices to and through the various processing baths. By means of this simple loading frame, a plurality of film hangers may be readily positioned and connected to the detachably and swingably connected handling devices.

In order to adapt a loading frame to the type of handling device shown in Fig. 7, the opposite sides of the opening 41 have secured thereto, in any suitable well-known manner, plates 50 the upper edges of which are formed with notches 51 adapted to receive the portions 15, the latter being supported on the bottom edges 52 of the notches 51, as best shown in Fig. 10. The edges 52 are spaced slightly above the base 40, as shown in Figs. 7 and 10, so that the apertured plate 30 may be positioned below the portions 15 and with the apertures 31 in vertical alignment with and below the said portions, as shown in Fig. 8. Now, as the handles 21 are moved upwardly the portions 15 move into the apertures 31 and the lower edges 32 thereof are brought into engagement with the portions 15 so that the hangers are supported on the lifting or handling devices and may now be lifted as a unit from the loading box or frame. By means of this arrangement, a plurality of hangers may be positioned and connected to the handling devices of the type illustrated in Figs. 7 and 10.

The loading box or frame may be fastened to a wall or other suitable support. For loading purposes, the loading box is preferably of the construction shown and described above. However, the loading box may be designed to provide a complete enclosure for the film hangers and the loading box may be provided with a light-tight cover. The hangers with exposed film may then be placed in such a light-tight container and stored until sufficient, or the desired, number of hangers have been accumulated for processing at one time. The handling devices may be swung upwardly to automatically connect the devices to the film hangers so that the latter may be lifted out of the light-tight box. With this arrangement, it would not be necessary to keep the room dark to prevent fogging of the films during the storing operation.

It will be apparent from the above description that the present invention provides simple and rugged handling or lifting devices which are rockably and detachably connected to a plurality of film hangers to permit such hangers to be handled and moved as a unit. The hangers may be individually connected or assembled on the handling devices, or a loading frame or box may be provided in which a plurality of hangers may be assembled and simultaneously connected to the lifting or handling devices.

While certain embodiments of the invention have been disclosed, it is to be understood that the inventive idea may be carried out in a number of ways. This application is therefore, not to be limited to the precise details disclosed, but is intended to cover all variations and modifications thereof falling within the scope of the appended claims.

I claim:

1. A handling device for use with a plurality of film hangers each of which is formed with a tie rod having laterally extending portions, said device comprising a pair of sections each of which is formed with a plurality of openings positioned in aligned adjacent relation with and adapted to receive detachably a plurality of adjacent portions, means on each of said sections for supporting said portions separately and independently, said sections rockably engaging said portions, and gripping means formed rigidly with said sections and arranged to be moved toward each other when said sections are rocked on said portion to bring said means into adjacent relation to provide a single handle by which the plurality of hangers may be lifted and moved.

2. A handling device for use with a plurality of film hangers each of which is formed with a tie rod having laterally projecting portions, said device comprising a pair of sections each of which is provided with a plurality of openings positioned in aligned adjacent relation with and adapted to receive portions of adjacent hangers, means on each of said sections for supporting the portions of each hanger separately and to engage said sections detachably and swingably with said portions, and a gripping member rigidly connected to each of said sections and adapted to be moved when said sections are rocked on said portions to move said members toward each other to form a single handle by which the plurality of hangers may be lifted and moved as a unit.

3. A handling device for use with film hangers each of which is formed with a tie rod having laterally extending portions, said device comprising a loading frame adapted to receive said hangers in suspended relation, means on said frame for receiving and supporting said tie rods with said portions projecting laterally beyond said means, hanger-lifting means horizontally arranged on said frame adjacent said first means, and portion-supporting sections on said lifting means positioned below and in vertical alignment with said portions, said lifting means being rockable about said sections from a horizontal to a vertical position to move said sections into supporting relation with said portions to lift said hangers from said frame.

4. A handling device for use with film hangers each of which is formed with a tie rod having laterally projecting portions, said device comprising a horizontally arranged loading frame adapted to receive a plurality of hangers in substantially suspended relation, a plurality of supporting members arranged at opposite ends of said frame, hanger-supporting areas on said members for receiving and supporting said portions to maintain said hangers in suspended relation on said frame, lifting members, means on said frames for positioning said lifting members in a horizontal relation thereon adjacent said supporting members and below said areas, said lifting members having openings arranged adjacent and beneath and in alignment with said areas, said lifting members being movable from a horizontal position to a vertical position to position said ends in said openings, and supporting members on said lifting members adjacent said openings for supporting said portions when said members are in vertical position so that said plurality of hangers may be lifted as a unit from said frame.

5. A handling device for use with film hangers each of which is formed with a tie rod having laterally projecting portions, said device comprising a loading frame formed with a central aperture through which a plurality of hangers may be inserted, a notched supporting plate secured to the opposite edges of said aperture to receive and support said portions to maintain said hangers in suspended relation on said frame, said portions extending beyond said plate, lifting members supported in a horizontal relation on and movable relative to said frame, means on said frame adjacent said supporting plate to position said lifting means with sections thereof arranged below the notches of said plate, said sections being provided with openings arranged in alignment with the notches of said plate to receive said portions when said lifting members are moved to a vertical position relative to said frame, and supporting members for said portions on said lifting members and engaging said portions when said members are moved to said vertical position so that said hangers may be lifted as a unit from said frame.

6. A handling device for use with film hangers each of which is formed with a tie rod having laterally projecting portions, said device comprising a loading frame formed with a base having a central aperture through which a plurality of hangers may be inserted, plates secured to the opposite edges of said aperture, supporting areas formed on said plates for receiving and supporting said portions above said base, said portions extending beyond said plates, lifting devices mounted in horizontal relation on said base with sections positioned adjacent and below said areas, said sections having a plurality of openings, means on said frame for positioning said devices with said openings arranged below and in alignment with said areas so that when said devices are removed from a horizontal to a vertical position, the portions will move into said openings, means on said sections positionable under said areas to engage the portions to secure said sections rockably and detachably to said portions when said sections are moved from a horizontal to a vertical position, and gripping members rigidly secured to said sections and movable toward each other to form a single handle by which the plurality of hangers may be lifted as a unit from said frame and moved as a unit.

7. A handling device for use with film hangers each of which is formed with a tie rod having laterally projecting portions, said device comprising a loading frame having parts thereof adapted to receive said portions to support said hangers, hanger lifting means formed with a portion supporting section and openings adjacent said sections to receive said portions, means on said frame adjacent said parts for supporting and positioning said lifting means horizontally thereon with said section arranged below said portions and said openings in vertical alignment therewith, and handle means on said lifting means for rocking the lifting means about said section from a horizontal to a vertical position relative to said hangers to position said portions in said openings and in position to be supported on said sections when said lifting means is raised relative to said frame.

8. A handling device for use with film hangers each of which is formed with a tie rod having laterally projecting portions, said device comprising a loading frame adapted to receive a plurality of hangers arranged in substantially vertical relation, means on said frame for receiving and supporting said portions to maintain said hangers in suspended relation on said frame, a pair of hanger lifting members, means on said frame for supporting said members in horizontal relation adjacent the ends of said portions, each of said members being formed to provide portion-supporting sections positioned below and portion-receiving openings arranged in alignment with said portions, and means for rocking said members about said sections to position said portions in said openings and in engagement with said sections to be supported thereby when said members are lifted to raise said hangers out of said frame.

LEFFERD B. HAUGHWOUT.

REFERENCES CITED

The following references are of record in the file of this patent:

UNITED STATES PATENTS

| Number | Name | Date |
|---|---|---|
| 641,340 | Smith | Jan. 16, 1900 |
| 1,311,958 | Finlay | Aug. 5, 1919 |
| 1,351,705 | Stimatze | Aug. 31, 1920 |
| 1,750,878 | Coe | Mar. 18, 1930 |
| 2,327,733 | Moore | Aug. 24, 1943 |
| 2,404,533 | Rodgers et al. | July 23, 1946 |
| 2,436,882 | Edelhart | Mar. 2, 1948 |

FOREIGN PATENTS

| Number | Country | Date |
|---|---|---|
| 38,452 | Austria | Aug. 25, 1909 |

Certificate of Correction

Patent No. 2,525,746       October 10, 1950

LEFFERD B. HAUGHWOUT

It is hereby certified that error appears in the printed specification of the above numbered patent requiring correction as follows:

Column 2, line 53, for the word "rows" read *rods*; column 6, line 63, for "removed" read *moved*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*